July 15, 1969     E. STECHEMESSER ET AL     3,455,217
COMPOSING APPARATUS

Filed Nov. 2, 1966     3 Sheets-Sheet 1

INVENTORS
ERNST STECHEMESSER
REINHOLD GEBHARDT
BY
Michael S. Striker
their ATTORNEY

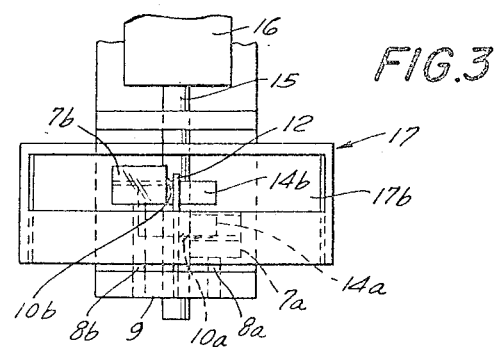
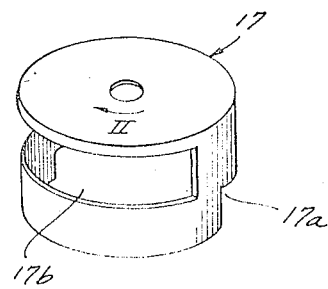
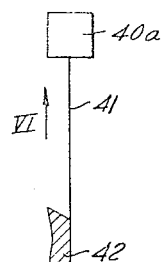
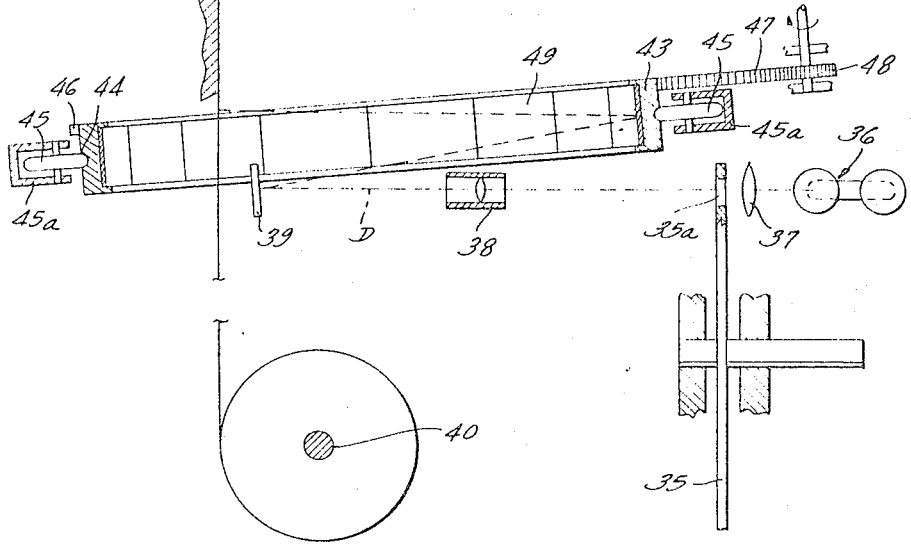

3,455,217
COMPOSING APPARATUS
Ernst Stechemesser, Gottingen, and Reinhold Gebhardt, Nuremburg, Germany, assignors to Grundig E.M.V. Elektro-Mechanische Versuchsanstalt Inh. Max Grundig, Furth, Bavaria, Germany
Filed Nov. 2, 1966, Ser. No. 591,577
Claims priority, application Germany, Nov. 6, 1965, G 45,120
Int. Cl. B41b 15/02
U.S. Cl. 95—4.5                                9 Claims

ABSTRACT OF THE DISCLOSURE

A photographic composing apparatus wherein two rockable mirrors alternate to project images of symbols carried by a matrix support onto a heat- and/or light-sensitive sheet in such a way that lines of images are projected at right angles to the direction of stepwise travel of the sheet.

---

The present invention relates to composing apparatus in general, and more particularly to improvements in optical composing apparatus wherein images of various symbols are projected onto sheets of heat- and/or light-sensitive material. Still more particularly, the invention relates mainly to improvements in such parts of optical composing apparatus which are utilized to project images of letters, numerals and/or other types of symbols onto a senstised sheet. The images are produced by light rays passing through selected symbols provided on matrix support and consisting of transparencies or cutouts which can be penetrated by light. Composing apparatus to which our present invention pertains may be used in connection with teletypewriters or like machines.

A drawback of presently known optical composing apparatus is that the projection of a series of images onto a sensitised sheet necessitates relative movement between the sheet and matrix support. For example, the matrix support is often constituted by a constantly driven disk and the sheet is advanced continuously to receive images of successive symbols which are illuminated by a suitable flash unit or the like. The movements produce noise and cause at least some vibration which results in blurring of symbols on the sensitised sheet. Also, the distance between such symbols whose images are about to be projected and the sensitised sheet is not uniform so that the size of and/or the spacing between the symbols varies considerably; in fact, it happens frequently that the symbols reproduced on the sensitised sheet are inclined in different directions. This can occur as a result of vibrations, especially when large masses must be moved suddenly in order to reproduce successive symbols. The above-outlined drawbacks will develop regardless of whether the matrix support travels with reference to the sensitised sheet or vice versa.

Accordingly, it is an important object of our invention to improve the construction and operation of the above-outlined conventional composing apparatus, especially to reduce the noise by reducing the number and mass of moving parts and to insure that the apparatus can reproduce symbols in rapid sequence, with utmost accuracy and economically.

Another object of the invention is to provide a novel arrangement of parts which are utilized to project images of illuminated symbols onto a heat- and/or light-sensitised sheet so that such images will form full lines of intelligence and that the reproduction of each image will occur with the same degree of precision.

A further object of the invention is to provide a system of mirrors which may be utilized in the projecting arrangement and to provide a novel driving assembly for such mirrors.

An additional object of the invention is to provide a composing apparatus wherein the sensitised sheet can be transported by resorting to simple transporting mechanism and wherein the sheet need not move during transfer of symbols onto its sensitised surface.

A concomitant object of the invention is to provide a composing apparatus wherein the matrix support need not move with reference to the sensitised sheet for the purpose of insuring that the sheet will receive lines of accurately reproduced and properly aligned symbols.

Still another object of the invention is to provide a composing apparatus which can be used to reproduce any desired types or sizes of symbols and wherein each of a series of successively reproduced symbols is of exactly the same size.

A further object of the invention is to provide a composing apparatus which can utilize commercially available sensitised sheet stock and which can also utilize several other elements of conventional composing apparatus.

Briefly stated, one feature of our invention resides in the provision of a composing apparatus comprising a matrix support having a plurality of symbols whose images are to be projected onto a sheet of light- and/or temperature-sensitive material, means for moving the matrix support to place selected symbols into a projection position, transporting means for advancing a sheet of sensitised material stepwise in a predetermined direction so that the sheet can receive a line of symbols during dwell between successive adavnces whereby such lines extend transversely of the direction of transport, an intermittent discharge device arranged to illuminate and to thus produce images of symbols which are placed into projection postion, and projecting means for directing such images upon the sheet. The projecting means comprises mirror means movable in a direction to reflect onto the sheet a sequence of images of symbols placed into projection position during dwell of the sheet between successive operations of the transporting means.

The mirror means may comprise rockable mirrors or an annulus of mirrors which are driven to rotate about a common axis. Each mirror preferably reflects a full line of images.

The novel features which are considered as characteristic of the invention are set forth in particular in the appended claims. The improved composing apparatus itself, however, both as to its construction and its mode of operation, together with additional features and advantages thereof, will be best understood upon perusal of the following detailed description of certain specific embodiments with reference to the accompanying drawings, in which:

FIG. 3 is a front elevational view of the composing apparatus as seen in the direction of arrow 103 in FIG. 1;

FIG. 4 is a perspective view of a masking means which is utilized in the composing apparatus of FIGS. 1 to 3;

FIG. 7 is a vertical sectional view of a third composing apparatus.

Figure 1:
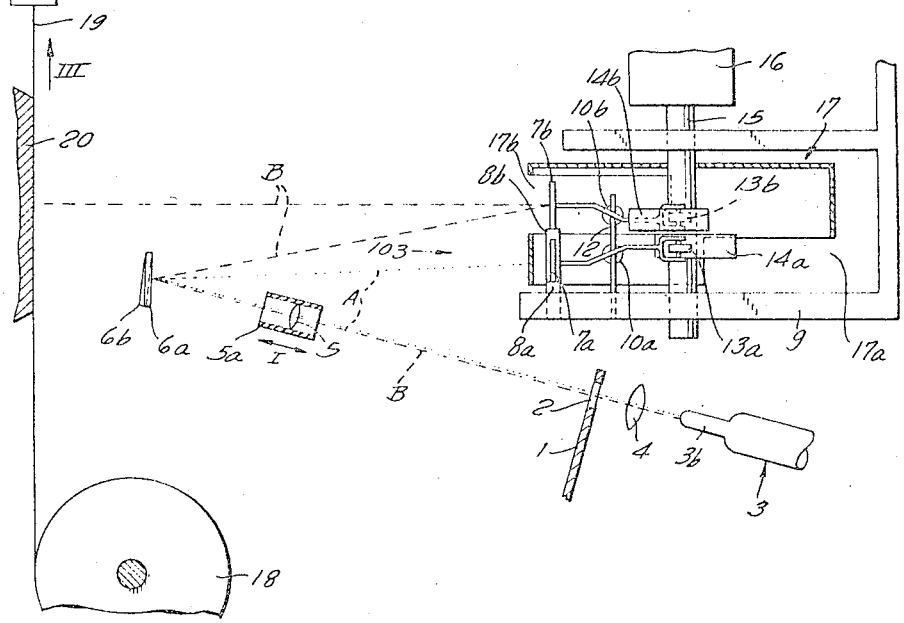
FIG. 1 is a side elevational view of a composing apparatus which embodies one form of our invention, certain elements of the apparatus being shown in vertical section.
Figure 2:
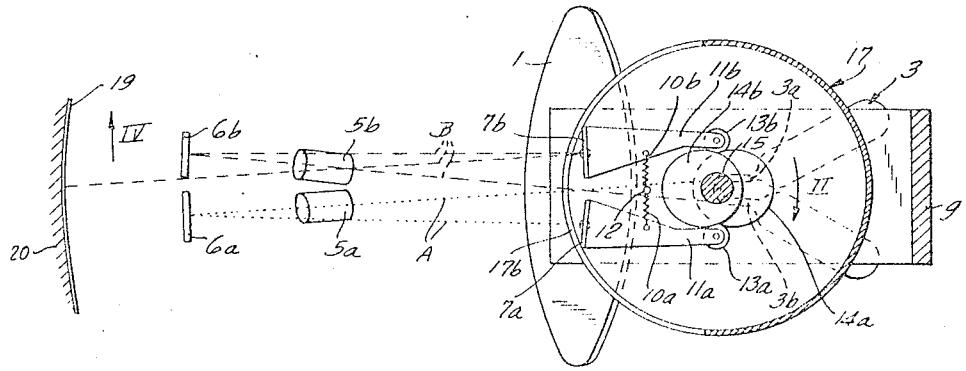
FIG. 2 is a top plan view of the composing apparatus, with the transporting mechanism for the sensitised sheet omitted.

Referring first to FIGS. 1 and 2, there is shown an optical composing apparatus which includes a matrix support in the form of a disk 1 rotatable about a fixed axis and provided with an annulus of symbols 2 (e.g., numerals and/or letters) which are formed by cutouts or transparencies in the body of the disk 1. The latter is driven continuously or intermittently to place selected symbols 2 into a projection position behind a condenser lens 4. The images of such selected symbols are then projected onto a sensitised sheet 19 in response to flashes produced by an intermittent discharge device 3 here shown as a twin flash tube which comprises a V-shaped body having legs 3a, 3b. Flashes of short duration produced in these legs will send bundles of light rays A, B which pass through the condenser lens 4 and through that symbol 2 which is held in the projection position. Two additional lens systems 5a, 5b are provided past the disk 1 and are movable in parallelism with the direction of travel of light rays A and B, see the arrow I. The purpose of the lens systems 5a, 5b is to change the size of images on the sensitised sheet 19, and each of these lens systems comprises a tubular mount accommodating one or more lenses 5.

The projecting means for directing images of selected symbols 2 onto the sheet 19 comprises a system of mirrors including two plano mirrors 6a, 6b located past the lens systems 5a, 5b and arranged to reflect the images onto mirrors 7a, 7b which are mounted and movable in opposite directions in accordance with a first embodiment of the present invention.

The mirrors 7a and 7b are rotatable about the axes of two parallel shafts 8a, 8b (see FIG. 3) mounted in a holder 9. These mirrors are respectively provided with extensions or arms 11a, 11b for roller followers 13a, 13b which are biased by helical springs 10a, 10b to track the peripheries of two eccentric drive cams 14a, 14b. One end of each of the springs 10a, 10b is anchored in a post 12 carried by the holder 9. The drive cams 14a, 14b are mounted on a common drive shaft 15 constantly rotated in the direction of arrow II (FIG. 2) by an electric motor 16.

The shaft 15 also carries a hollow cylindrical mask 17 which is illustrated in FIG. 4. This mask is formed with two arcuate slots 17a, 17b which are staggered circumferentially and axially with reference to each other. When the mask 17 rotates, it shields the mirror 7a from the light rays A while the light rays B are free to pass through the slot 17b to reach the mirror 7b, and the mirror 7a will be reached by the light rays A when the mask 17 shields the mirror 7b from the light rays B.

The drive cams 14a, 14b cause the mirrors 7a, 7b to rock between first and second end positions whereby the mirror 7a travels back to first end positions while the mirror 7b travels to second end position and is reached by the light rays B, and vice versa.

The sensitised sheet 19 is stored on a reel 18 and is advanced stepwise by a transporting mechanism 18a of known design. This transporting mechanism advances the sheet 19 upwardly, as indicated in FIG. 1 by arrow III, and at such intervals that the mirror 7a or 7b can project a horizontal line of images while the sheet dwells between successive advances. The lines of images are normal to the direction of transport of the sheet 19 and that portion of the sheet which receives a line of images is located in front of a back support 20. The sheet 19 may be constituted by a strip of photographic film, but it is equally possible to utilize heat-sensitive sheet material.

A suitable synchronizing arrangement is provided to synchronize rotary movements of the disk 1 with the means which triggers the discharge of flashes in the arms 3a, 3b of the flash tube 3. The operation of the synchronizing arrangement is such that the tube 3 is fired when a selected symbol 2 reaches the projection position whereby a bundle A or B or light rays passes from the arm 3a or 3b, through the selected symbol 2 and lens system 5a or 5b to project an image of the symbol onto the plano mirror 6a or 6b. Synchronizing arrangements which may be utilized in the composing apparatus of our present invention are disclosed, for example, in U.S. Patents Nos. 2,714,841, 2,775,172 and 3,117,502. The synchronizing arrangement disclosed in columns 2–4 of Patent No. 2,775,172 is particularly suited for use in the composing apparatus of our FIGS. 1–4.

The operation is as follows:

Depending on the momentary angular position of the mask 17, the latter will prevent the light rays A or B from reaching the mirror 7a or 7b. Thus, the lower portion of the mask 17 can move across the path of light which is reflected on the plano mirror 6a and the upper part of the mask can be moved across the path of light reflected on the mirror 6b. As shown in FIGS. 1–3, the mask 17 is in the position in which the slot 17a is out of registry with the light rays A so that the mirror 7a cannot reflect any light but the mirror 7b is free to reflect images represented by successively emitted light rays B because the slot 17b is located between the mirror 6b and mirror 7b. Therefore, the mirror 7b reflects such images onto the sensitised sheet 19. The loci of successively projected images will travel along a horizontal line (arrow IV in FIG. 2) because the mirror 7b is rocked by the constantly rotating drive cam 14b and travels from its first to its second end position. This produces a sequence of selected symbols on the sheet 19, namely, on that portion of the sheet which is located in front of the back support 20.

The cam 14b thereupon compels the mirror 7b to travel in the opposite direction (i.e., back to its first end position) and the mask 17 simultaneously crosses the path of light rays B. At the same time, the slot 17a allows the light rays A to reach the mirror 7a which then travels from its first to its second end position (drive cam 14a in cooperation with follower 13a and spring 10a). The transporting mechanism 18a advances the sheet 19 by a step (arrow III in FIG. 1) when the mirrors 7a 7b respectively assume their first and second end positions. The mirror 7a thereupon projects a series of images to complete a line of symbols on the sheet 19 while the mirror 7b continues to travel back to first end position to take over when the mirror 7a reaches the second end position.

If the distance between the mirrors 7a, 7b and the back support 20 is relatively short, the back support 20 is preferably configurated in a manner as shown in FIG. 2 so as to maintain the sheet 19 in an arcuate plane whose center of curvature is located on an axis extending midway between the mirrors 7a and 7b in the positions shown in FIG. 3. This insures projection of sharply defined distortion-free images of identical height along the entire line of such images on the sheet 19.

Figure 5:
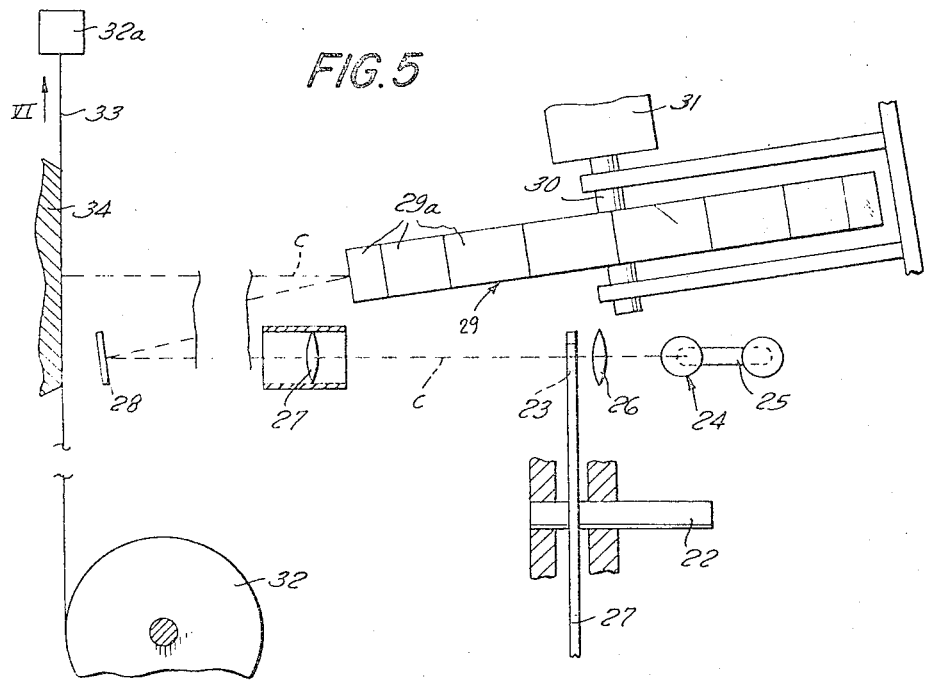
FIG. 5 is a side elevational view of a second composing apparatus, with certain parts shown in vertical section.
Figure 6:
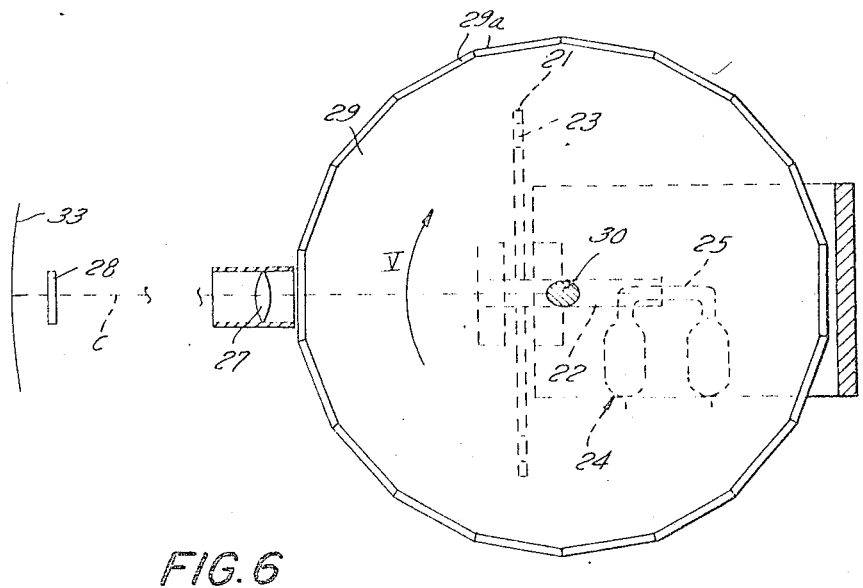
FIG. 6 is a top plan view of the structure shown in FIG. 5, with certain parts shown in horizontal section.

FIGS. 5 and 6 illustrative a second composing apparatus which comprises modified projecting means. The matrix support is constituted by a disk 21 which is rotated about the axis of its drive shaft 22 by a synchronizing arrangement of the type mentioned in connection with FIGS. 1–4. The disk 21 carries an annulus of symbols 23 which are constituted by cutouts of transparencies and can be placed into a projection position across the path of light rays issuing from an intermittent discharge device here shown as a U-shaped flash tube 24. The capillary arm 25 of the flash tube 24 can emit bundles of light rays C which pass through a condenser lens 26, through a symbol 23 in projection position, through a lens system 27 (which is reciprocable in the direction of travel of the rays C), and against a plano mirror 28. The latter reflects the images of symbols 23 onto successive mirrors 29a which form an annulus about the periphery of a rotor 29. This rotor resembles a disk rotated by an inclined drive shaft 30 which receives motion from a constantly driven electric motor 31.

Sensitised sheet stock 33 is stored on a reel 32 and is advanced stepwise by a transporting mechanism 32a (arrow VI in FIG. 5) so that successive increments of the sheet move in front of a back support 34. The rotor 29 is driven in the direction indicated by arrow V (FIG. 6), whereby the mirrors 29a reflect the images of successive symbols 23 onto the sensitised sheet 33 whereon such images form a line of symbols extending at right angles to the direction indicated by arrow VI. The arrangement is such that each successive mirror 29a reflects a full line of images and the sheet 33 is advanced by a step when the light rays C reach an edge between two successive mirrors 29a. The next-following mirror 29a thereupon reflects a fresh line of images, and so forth. The projection of images begins along one edge and continues along a line toward the other edge of the sheet 33.

FIG. 7 illustrates a third composing apparatus which is similar to the apparatus of FIGS. 5 and 6. The mounting of the matrix support 35, intermittent discharge device 36, condenser lens 37, reciprocable lens system 38 and plano mirror 39 is identical with the mounting of corresponding components in the apparatus of FIGS. 5 and 6. The rotor 29 is replaced by a ring-shaped rotor 43 whose internal surface is provided with an annulus of mutually inclined mirrors 49 corresponding to the mirrors 29a. The sensitised sheet 41 is stored on a reel 40 and is advanced in a path extending through the interior of the hollow rotor 43 and in front of a back support 42. The transporting mechanism is shown at 40a.

The peripheral surface of the rotor 43 is formed with a circumferentially complete groove 44 which receives portions of several rollers 45 forming part of centering and supporting means for the rotor 43 and its mirrors 49. The rollers 45 are mounted in fixed frame members 45a. The drive means for the rotor 43 comprises a ring gear 46 which is integral therewith and meshes with an internally toothed endless drive belt 47 which is trained around a driver gear 48 receiving motion from an electric motor or another suitable prime mover, not shown. The supporting means for the rotor 43 preferably comprises at least three rollers 45.

Bundles of light rays D produced in response to firing of the flash tube 36 pass through the condenser lens 37, such symbols 35a of the disk 35 which are held in projection position, lens system 38, and on to the plano mirror 39 to be reflected against one of the mirrors 49 and thence onto the sensitised sheet 41. As in the embodiment of FIGS. 5 and 6, each mirror 49 will reflect a full line of images and the transporting mechanism 40a will advance the sheet 41 by a step (arrow VI) when the path of light rays D is crossed by an edge between two successive mirrors 49.

A very important advantage of our composing apparatus is seen to reside in that the operation is practically noiseless. This is due to the fact that the mass of moving parts is relatively small because the sensitised sheets 19, 33 or 41 receives images of symbols while the transporting mechanism is idle and because the matrix support 1, 21 or 35 merely rotates but need not perform any other types of movements. The masses of mirrors 7a, 7b, 29a or 49 are small.

Another important advantage is seen to reside in the provision of reciprocable lens systems 5a, 5b, 27, 38 which enable the personnel in charge to select the desired size of symbols on the sensitised sheet. It is clear that these lens systems may be replaced by systems whose optical elements are pivotable across and from the path of light rays without departing from the spirit of our invention. Each such pivotable lens system will preferably comprise two or more optical elements of different focal length, and each optical element may comprise a single lens or a set of several matching lenses.

In the embodiments of FIGS. 5, 6 and 7, the intermittent discharge devices 24 and 36 are used more economically then in the embodiment of FIGS. 1–4 wherein the mask 17 alternatively intercepts the rays issuing from the arms 3a, 3b. On the other hand, the embodiment of FIGS. 1–4 utilizes a lesser number of mirrors.

Experiments carried out with our apparatus have shown that the mirrors can reflect images of symbols in rapid sequence, with sharply defined contours and that such images can be reflected onto many different types of sensitised sheets. As stated before, such sheets may be sensitive to light and/or heat. Many types of light- and/or heat-sensitive sheets are available on the market. In some instances, it might be advisable to subject exposed sheets to secondary treatment to insure that the symbols will not disappear or become less pronounced with age. However, many presently known sensitised sheets can be used in our apparatus without necessitating any treatment and such sheets will retain the representations of projected images for several years or indefinitely.

Without further analysis, the foregoing will so fully reveal the gist of the present invention that others can, by applying current knowledge, readily adapt it for various applications without omitting features which fairly constitute essential characteristics of the generic and specific aspects of our contribution to the art.

What is claimed as new and desired to be protected by Letters Patent is:

1. Composing apparatus, comprising a matrix support bearing a plurality of symbols whose images are to be projected onto a sensitized sheet, said matrix support being movable to place selected symbols into a projection position; transporting means for advancing a sensitized sheet stepwise in a predetermined direction so that the sheet can receive a line of images during dwell between successive advances thereof, such lines extending transversely of the direction of transport; an intermittent discharge device arranged to illuminate the symbols in said projection position; and projecting means for directing image of illuminated symbols upon the sensitized sheet, said projecting means comprising mirror means movable in a direction to reflect onto the sensitized sheet images of symbols placed into projection position during dwell of said sheet between successive advances thereof, said mirror means comprising two mirrors each rockable about a separate axis and means for rocking said mirrors between first and second positions about said separate axes, said separate axes being at least substantially parallel to said predetermined direction.

2. Composing apparatus as defined in claim 1, further comprising masking means for shielding one of said mirrors from said discharge device while the other mirror moves from first to second position to reflect a line of images onto said sheet and vice versa.

3. Composing apparatus as defined in claim 1, further comprising optical means for changing the sizes of said images on the sheet.

4. Composing apparatus as defined in claim 1, further comprising optical means movable into and from the path in which the images are projected to change the size of such images.

5. Composing apparatus as defined in claim 1, wherein said matrix support comprises a rotary disk and wherein said symbols are constituted by light-penetrable portions of said disk.

6. Composing apparatus as defined in claim 5, wherein said intermittent discharge device comprises a flash unit arranged to direct light against one side of said disk whereby batches of light rays pass through such symbols which are placed into said projection position.

7. Composing apparatus as defined in claim 1, wherein the means for rocking said mirrors comprises eccentric drive means.

8. Composing apparatus as defined in claim 1, wherein said intermittent discharge device comprises a flash tube arranged to emit two bundles of light rays each of which is directed against one of said mirrors in the first position of the respective mirror.

9. Composing apparatus as defined in claim 1, wherein said mirror means further comprises two additional mirrors each positioned to direct images onto one of said first-mentioned mirrors.

References Cited

UNITED STATES PATENTS

| | | | |
|---|---|---|---|
| 2,670,665 | 3/1954 | Caldwell | 95—4.5 |
| 2,725,803 | 12/1955 | Tansel | 95—4.5 |
| 2,853,918 | 9/1958 | Yoler | 352—84 |

JOHN M. HORAN, Primary Examiner